(12) United States Patent
Nocine

(10) Patent No.: US 10,618,053 B2
(45) Date of Patent: Apr. 14, 2020

(54) VEGETABLE MATTER GRINDING ASSEMBLY

(71) Applicant: John Nocine, Mount Oliver, PA (US)

(72) Inventor: John Nocine, Mount Oliver, PA (US)

( * ) Notice: Subject to any disclaimer, the term of this patent is extended or adjusted under 35 U.S.C. 154(b) by 498 days.

(21) Appl. No.: 15/433,078

(22) Filed: Feb. 15, 2017

(65) Prior Publication Data

US 2018/0229243 A1 Aug. 16, 2018

(51) Int. Cl.
| | |
|---|---|
| *B02C 18/22* | (2006.01) |
| *B02C 18/12* | (2006.01) |
| *A47J 42/30* | (2006.01) |
| *A47J 42/26* | (2006.01) |
| *B02C 18/16* | (2006.01) |
| *B02C 23/08* | (2006.01) |

(52) U.S. Cl.
CPC .............. *B02C 18/12* (2013.01); *A47J 42/26* (2013.01); *A47J 42/30* (2013.01); *B02C 18/16* (2013.01); *B02C 23/08* (2013.01)

(58) Field of Classification Search
CPC ......... B02C 18/12; B02C 18/16; B02C 23/08; A47J 42/26; A47J 42/30
See application file for complete search history.

(56) References Cited

U.S. PATENT DOCUMENTS

| | | | |
|---|---|---|---|
| 5,096,128 A * | 3/1992 | Chang ................. | B02C 19/0075 241/160 |
| D378,653 S | 4/1997 | Richardi | |
| 6,446,891 B1 | 9/2002 | Leung | |
| 6,467,709 B1 | 10/2002 | Hattori | |
| 8,695,906 B2 | 4/2014 | Hainbach | |
| 8,882,010 B2 | 11/2014 | Scharf et al. | |
| 9,149,810 B2 * | 10/2015 | Jagle ....................... | B02C 18/12 |
| 9,198,541 B2 | 12/2015 | Smith | |
| 2004/0000605 A1 * | 1/2004 | McPherson ........... | A61F 2/4644 241/30 |
| 2004/0155132 A1 * | 8/2004 | McPherson ........... | A61F 2/4644 241/199.12 |
| 2008/0302890 A1 * | 12/2008 | Misawa ............. | B02C 18/0092 241/46.013 |
| 2009/0050720 A1 | 2/2009 | Kikuchi et al. | |
| 2012/0228415 A1 * | 9/2012 | Jagle ....................... | B02C 18/12 241/100 |
| 2016/0106262 A1 * | 4/2016 | Mroue .................... | A47J 42/26 241/79 |
| 2016/0270597 A1 * | 9/2016 | Walczak ................. | A47J 42/26 |

* cited by examiner

*Primary Examiner* — Omar Flores Sanchez

(57) ABSTRACT

A vegetable matter grinding assembly for grinding vegetable matter for smoking includes a first cylinder that may contain vegetable matter. A grinding unit is removably coupled to the first cylinder and the grinding unit is selectively manipulated. The grinding unit includes a plurality of blades to grind the vegetable matter into a plurality of fine particles. The fine particles are selectively smoked and inhaled from a smoking device.

17 Claims, 3 Drawing Sheets

US 10,618,053 B2

VEGETABLE MATTER GRINDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to grinding devices and more particularly pertains to a new grinding device for grinding vegetable matter for smoking.

BRIEF SUMMARY OF THE INVENTION

An embodiment of the disclosure meets the needs presented above by generally comprising a first cylinder that may contain vegetable matter. A grinding unit is removably coupled to the first cylinder and the grinding unit is selectively manipulated. The grinding unit includes a plurality of blades to grind the vegetable matter into a plurality of fine particles. The fine particles are selectively smoked and inhaled from a smoking device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
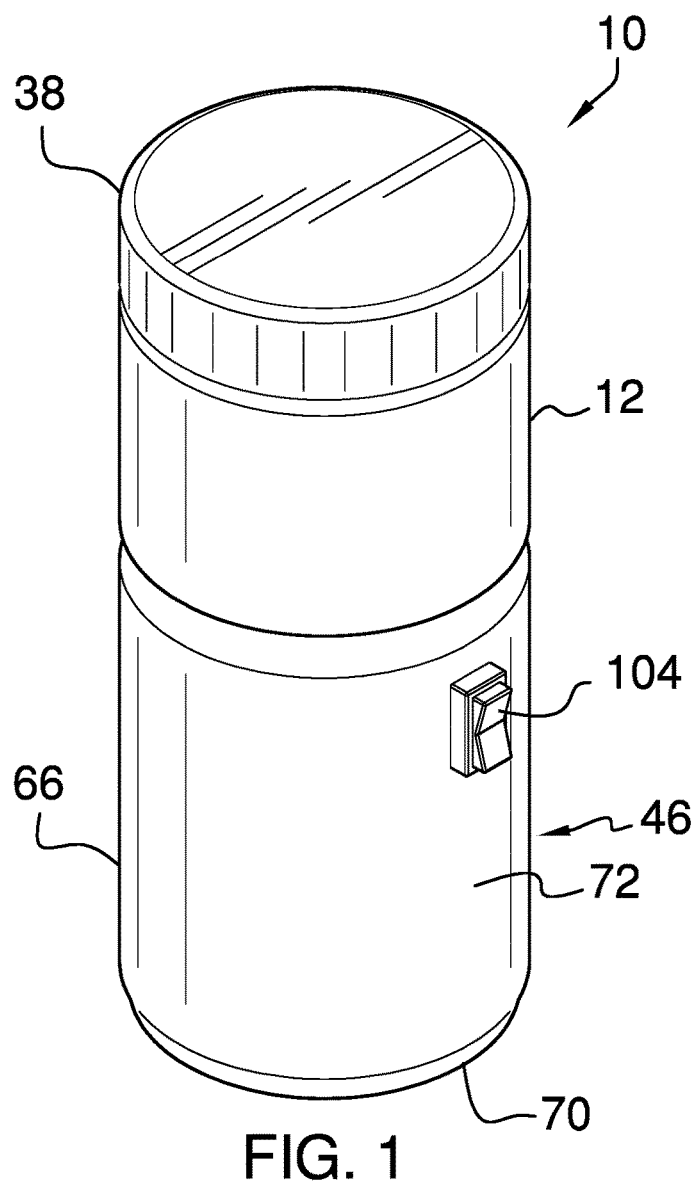
FIG. 1 is a front perspective view of a vegetable matter grinding assembly according to an embodiment of the disclosure.
Figure 2:
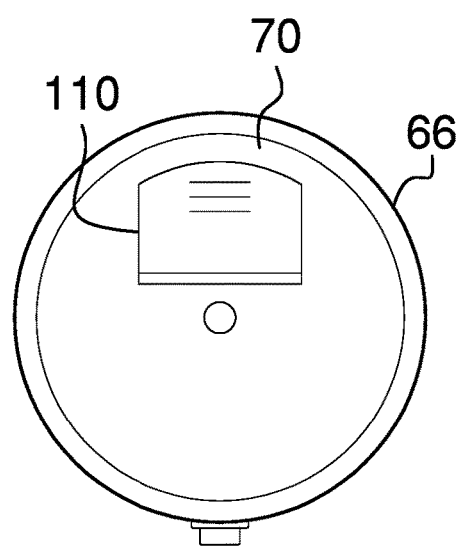
FIG. 2 is a bottom view of an embodiment of the disclosure.
Figure 3:
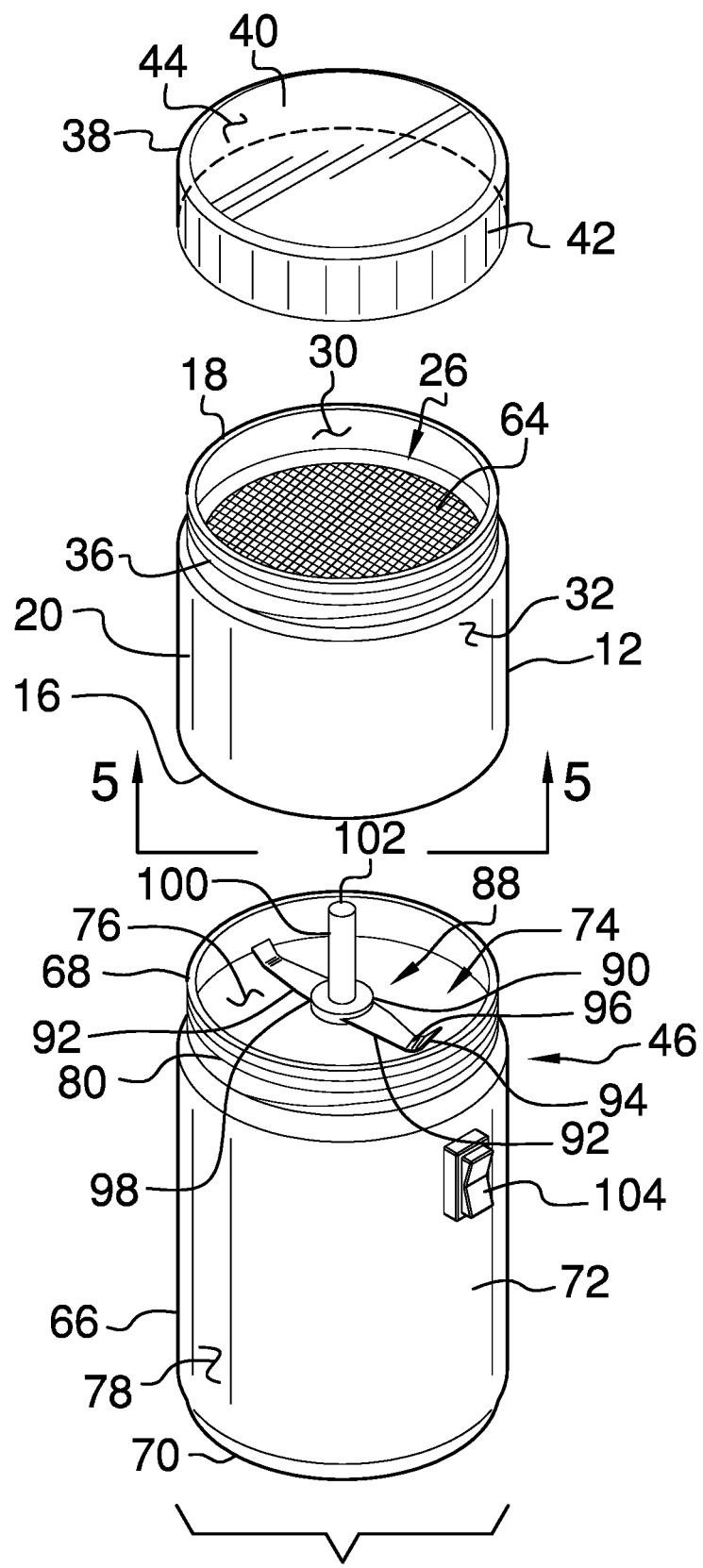
FIG. 3 is an exploded perspective view of an embodiment of the disclosure.
Figure 4:
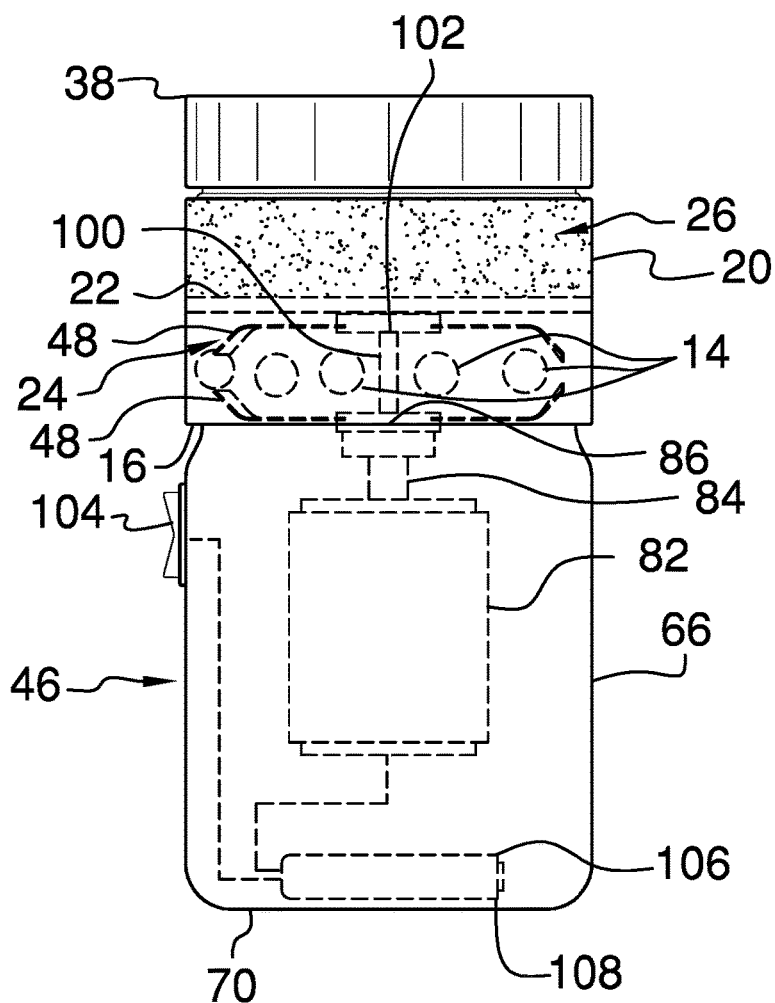
FIG. 4 is a side phantom view of an embodiment of the disclosure.
Figure 5:
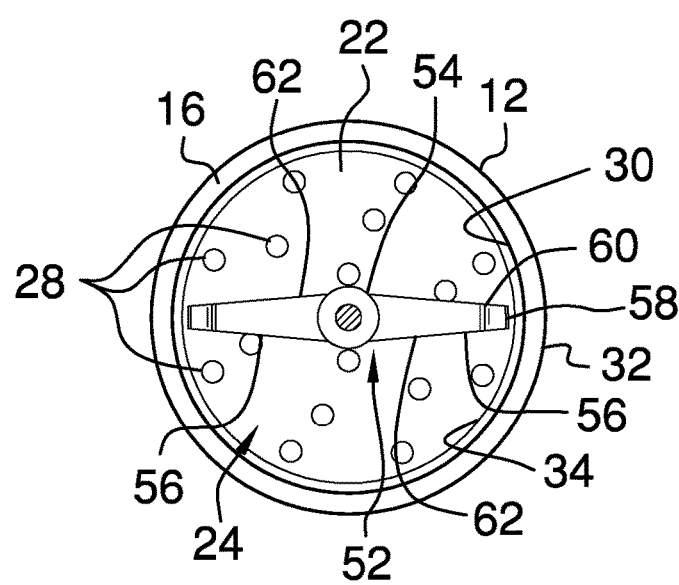
FIG. 5 is a bottom view of a first cylinder of an embodiment of the disclosure.

With reference now to the drawings, and in particular to FIGS. 1 through 5 thereof, a new grinding device embodying the principles and concepts of an embodiment of the disclosure and generally designated by the reference numeral 10 will be described.

As best illustrated in FIGS. 1 through 5, the vegetable matter grinding assembly 10 generally comprises a first cylinder 12 that may contain vegetable matter 14. The vegetable matter 14 may be tobacco or other vegetable matter 14 that is commonly smoked and inhaled. The first cylinder 12 has a first end 16, a second end 18 and an outer wall 20 extending therebetween. Each of the first end 16 and the second end 18 is open and the first cylinder 12 is substantially hollow.

A divider 22 is positioned in the first cylinder 12 and the divider 22 is positioned between the first end 16 and the second end 18 to define a first space 24 extending between the divider 22 and the first end 16. The first space 24 receives the vegetable matter 14 when the vegetable matter 14 is positioned on the first cylinder 12. The divider 22 defines a second space 26 extending between the divider 22 and the second end 18.

The divider 22 has a plurality of apertures 28 and each of the apertures 28 extends between the first space 24 and the second space 26. The apertures 28 are spaced apart from each other and are distributed on the divider 22. The outer wall 20 of the first cylinder 12 has an inner surface 30 and an outer surface 32. The inner surface 30 has a first threaded portion 34 extending upwardly from the first end 16. Moreover, the outer surface 32 has a second threaded portion 36 extending downwardly from the second end 18.

A lid 38 is provided that has a top wall 40 and a perimeter wall 42 extending downwardly therefrom. The perimeter wall 42 is continuous such that the lid 38 has a disk shape and the perimeter wall 42 has an inside surface 44. The inside surface 44 threadably engages the second threaded portion 36 on the first cylinder 12 such that the lid 38 selectively closes the second space 26.

A grinding unit 46 is removably coupled to the first cylinder 12 and the grinding unit 46 is selectively manipulated. The grinding unit 46 includes a plurality of blades 48 and each of the blades 48 grinds the vegetable matter 14 into the plurality of fine particles 50 thereby facilitating the fine particles 50 to be smoked and inhaled from a smoking device.

The grinding unit 46 comprises a first blade 52 that is rotatably coupled to the divider 22. The first blade 52 is positioned in the first space 24 to selectively grind the vegetable matter 14. The first blade 52 comprises a first hub 54 that is rotatably coupled to the divider 22. A pair of first arms 56 is each coupled to and extends away from the first hub 54. The first arms 56 are positioned on opposite sides of the first hub 54 and each of the first arms 56 has a distal end 58 with respect to the first hub 54. Each of the first arms 56 has a bend 60 thereon such that the distal end 58 corresponding to each of the first arms 56 is directed away form the divider 22. Each of the first arms 56 has a first edge 62 and the first edge 62 corresponding to each of the first arms 56 is sharpened. The first edge 62 corresponding to each of the first arms 56 chops the vegetable matter 14 into fine particles 50.

A screen 64 is coupled to the inner surface 30 of the outer wall 20 corresponding to the first cylinder 12 and the screen 64 is positioned in the second space 26. The screen 64 is positioned closer to the divider 22 than the second end 18. The apertures 28 in the divider 22 have a diameter that is small enough to inhibit the vegetable matter 14 from passing therethrough before the vegetable matter 14 is ground into the fine particles 50. The screen 64 filters the fine particles 50 from debris such as stems and seeds from the vegetable matter 14. The debris is retained in the first space 24 and the fine particles 50 are passed through the screen 64 into the second space 26.

The grinding unit 46 further comprises a second cylinder 66 that has primary end 68, a secondary end 70 and an exterior wall 72 extending therebetween. The primary end 68 has a well 74 extending toward the secondary end 70 and the well 74 has a bounding surface 76. The exterior wall 72 has an outside surface 78 and the outside surface 78 has a primary threaded portion 80 extending downwardly from the primary end 68. The primary threaded portion 80 threadably engaging the first threaded portion 34 on the first cylinder 12 such that the first cylinder 12 is removably coupled to the second cylinder 66.

A motor 82 is positioned within the second cylinder 66 and the motor 82 may be an electric motor 82 or the like. A first shaft 84 is coupled to the motor 82 and the motor 82 rotates the first shaft 84 when the motor 82 is turned on. The first shaft 84 extends upwardly through the bounding surface 76 of the well 74 and the first shaft 84 has a distal end 86 with respect to the bounding surface 76.

A second blade 88 is coupled to the distal end 86 of the first shaft 84 and the first shaft 84 rotates the second blade 88 when the motor 82 is turned on. The second blade 88 comprises a second hub 90 that is rotatably coupled to the distal end 86 of the first shaft 84. A pair of second arms 92 is coupled to and extends away from the second hub 90. The second arms 92 are positioned on opposite sides of the second hub 90 and each of the second arms 92 has a distal end 94 with respect to the second hub 90.

Each of the second arms 92 has a bend 96 thereon such that the distal end 96 corresponding to each of the second arms 92 is directed away form the bounding surface 76 of the well 74. Each of the second arms 92 has a second edge 98 and the second edge 98 corresponding to each of the second arms 92 is sharpened. In this way the second edge 98 corresponding to each of the second arms 92 grinds the vegetable matter 14 into the fine particles 50. The first blade 52 is aligned with the second blade 88 when the first cylinder 12 is coupled to the second cylinder 66. Moreover, the screen 64 in the first cylinder 12 passes the fine particles 50 into the second space 26 thereby facilitating the fine particles 50 to be removed from the second space 26.

A second shaft 100 is coupled to and extends upwardly from the second hub 90 and the second shaft 100 has a distal end 102 with respect to the second hub 90. The distal end 102 of the second shaft 100 engages the first hub 54 when the first cylinder 12 is removably coupled to the second cylinder 66. In this way the second shaft 100 rotates the first blade 52 when the motor 82 is turned on.

A switch 104 is coupled to the exterior wall 72 of the second cylinder 66 and the switch 104 is selectively manipulated. The switch 104 is electrically coupled to the motor 82 such that the switch 104 turns the motor 82 on and off. A power supply 106 is removably positioned within the second cylinder 66 and the power supply 106 is electrically coupled to the motor 82. The power supply 106 comprises at least one battery 108. A battery cover 110 is removably coupled to the secondary end 70 of the second cylinder 66 and the power supply 106 is positioned beneath the battery cover 110.

In use, the lid 38 is coupled to the first cylinder 12 and the vegetable matter 14 is placed into the first space 24 in the first cylinder 12. The second cylinder 66 is removably coupled to the first cylinder 12 and the switch 104 is manipulated to turn the motor 82 on. The motor 82 rotates the first blade 52 and the second blade 88 to grind the vegetable matter 14 into the fine particles 50. The fine particles 50 pass through each of the apertures 28 in the divider 22 and the screen 64. In this way the second space 26 receives the fine particles 50 while the debris is retained in the first space 24. The switch 104 is manipulated to turn the motor 82 off and the lid 38 is removed from the first cylinder 12. The fine particles 50 are removed from the second space 26 for smoking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A vegetable matter grinding assembly being configured to selectively grind vegetable matter thereby facilitating the vegetable matter to be smoked, said assembly comprising:
  a first cylinder being configured to contain vegetable matter, said first cylinder having a first end, a second end and an outer wall extending therebetween, each of said first end and said second end being open, said first cylinder being substantially hollow, said first cylinder having a divider being positioned therein, said divider being positioned between said first end and said second end to define a first space extending between said divider and said first end wherein said first space is configured to receive the vegetable matter, said divider defining a second space extending between said divider and said second end; and a grinding unit being removably coupled to said first cylinder wherein said grinding unit is configured to be manipulated, said grinding unit including a plurality of blades, each of said blades being configured to grind the vegetable matter into a plurality of fine particles thereby facilitating the fine particles to be smoked and inhaled from a smoking device.

2. The assembly according to claim 1, wherein said divider has a plurality of apertures, each of said apertures extending between said first space and said second space, said apertures being spaced apart from each other and being distributed on said divider.

3. The assembly according to claim 1, wherein said outer wall has an inner surface and an outer surface, said inner surface having a first threaded portion extending upwardly from said first end, said outer surface having a second threaded portion extending downwardly from said second end.

4. The assembly according to claim 1, further comprising a first blade being rotatably coupled to said divider, said first blade being positioned in said first space wherein said first blade is configured to selectively grind the vegetable matter.

5. The assembly according to claim 4, wherein said first blade comprises:
 a first hub being rotatably coupled to said divider; and
 a pair of first arms, each of said first arms being coupled to and extending away from said first hub, said first arms being positioned on opposite sides of said first hub, each of said first arms having a distal end with respect to said first hub, each of said first arms having a bend thereon such that said distal end corresponding to each of said first arms is directed away form said divider, each of said first arms having a first edge, said first edge corresponding to each of said first arms being sharpened wherein said first edge corresponding to each of said first arms is configured to grind the vegetable matter into the fine particles.

6. The assembly according to claim 3, further comprising a lid having a top wall and a perimeter wall extending downwardly therefrom, said perimeter wall being continuous such that said lid has a disk shape, said perimeter wall having an inside surface, said inside surface threadably engaging said second threaded portion on said first cylinder such that said lid selectively closes said second space.

7. The assembly according to claim 1, further comprising a screen being coupled to said inner surface of said outer wall, said screen being positioned in said second space, said screen being positioned closer to said divider than said second end.

8. A vegetable matter grinding assembly being configured to selectively grind vegetable matter thereby facilitating the vegetable matter to be smoked, said assembly comprising:
 a first cylinder being configured to contain vegetable matter;
 a grinding unit being removably coupled to said first cylinder wherein said grinding unit is configured to be manipulated, said grinding unit including a plurality of blades, each of said blades being configured to grind the vegetable matter into a plurality of fine particles thereby facilitating the fine particles to be smoked and inhaled from a smoking device; and
 said grinding unit comprising a second cylinder having primary end, a secondary and an exterior wall extending therebetween, said primary end having a well extending toward said secondary end, said well having a bounding surface.

9. The assembly according to claim 8, wherein:
 said first cylinder has a first threaded portion; and
 said exterior wall has an outside surface, said outside surface having a primary threaded portion extending downwardly from said primary end, said primary threaded portion threadably engaging said first threaded portion on said first cylinder such that said first cylinder is removably coupled to said second cylinder.

10. The assembly according to claim 8, further comprising a motor being positioned within said second cylinder.

11. The assembly according to claim 10, further comprising a first shaft being coupled to said motor such that said motor rotates said first shaft when said motor is turned on, said first shaft extending upwardly through said bounding surface of said well, said first shaft having a distal end with respect to said bounding surface.

12. The assembly according to claim 11, further comprising a second blade being coupled to said distal end of said first shaft such that said first shaft rotates said second blade when said motor is turned on.

13. The assembly according to claim 12, wherein:
 said first cylinder includes second space and a screen; and
 said second blade comprising:
  a second hub being rotatably coupled to said distal end of said first shaft; and
  a pair of second arms, each of said second arms being coupled to and extending away from said second hub, said second arms being positioned on opposite sides of said second hub, each of said second arms having a distal end with respect to said second hub, each of said second arms having a bend thereon such that said distal end corresponding to each of said second arms is directed away form said bounding surface of said well, each of said second arms having a second edge, said second edge corresponding to each of said second arms being sharpened wherein said second edge corresponding to each of said second arms is configured to grind the vegetable matter into the fine particles, said screen in said first cylinder being configured to pass the fine particles into said second space thereby facilitating the fine particles to be removed from said second space.

14. The assembly according to claim 13, further comprising:
 a first blade having a first hub; and
 a second shaft being coupled to and extending upwardly from said second hub, said second shaft having a distal end with respect to said second hub, said distal end of said second shaft engaging said first hub when said first cylinder is removably coupled to said second cylinder such that said second shaft rotates said first blade when said motor is turned on.

15. The assembly according to claim 10, further comprising a switch being coupled to said exterior wall of said second cylinder wherein said switch is configured to be manipulated, said switch being electrically coupled to said motor such that said switch turns said motor on and off.

16. The assembly according to claim 10, further comprising a power supply being removably positioned within said second cylinder, said power supply being electrically coupled to said motor, said power supply comprising at least one battery.

17. A vegetable matter grinding assembly being configured to selectively grind vegetable matter thereby facilitating the vegetable matter to be smoked, said assembly comprising:

a first cylinder being configured to contain vegetable matter, said first cylinder having a first end, a second end and an outer wall extending therebetween, each of said first end and said second end being open, said first cylinder being substantially hollow, said first cylinder having a divider being positioned therein, said divider being positioned between said first end and said second end to define a first space extending between said divider and said first end wherein said first space is configured to receive the vegetable matter, said divider defining a second space extending between said divider and said second end, said divider having a plurality of apertures, each of said apertures extending between said first space and said second space, said apertures being spaced apart from each other and being distributed on said divider, said outer wall having an inner surface and an outer surface, said inner surface having a first threaded portion extending upwardly from said first end, said outer surface having a second threaded portion extending downwardly from said second end;

a first blade being rotatably coupled to said divider, said first blade being positioned in said first space wherein said first blade is configured to selectively grind the vegetable matter, said first blade comprising:

a first hub being rotatably coupled to said divider, and a pair of first arms, each of said first arms being coupled to and extending away from said first hub, said first arms being positioned on opposite sides of said first hub, each of said first arms having a distal end with respect to said first hub, each of said first arms having a bend thereon such that said distal end corresponding to each of said first arms is directed away form said divider, each of said first arms having a first edge, said first edge corresponding to each of said first arms being sharpened wherein said first edge corresponding to each of said first arms is configured to grind the vegetable matter into the fine particles;

a screen being coupled to said inner surface of said outer wall, said screen being positioned in said second space, said screen being positioned closer to said divider than said second end;

a lid having a top wall and a perimeter wall extending downwardly therefrom, said perimeter wall being continuous such that said lid has a disk shape, said perimeter wall having an inside surface, said inside surface threadably engaging said second threaded portion on said first cylinder such that said lid selectively closes said second space; and a grinding unit being removably coupled to said first cylinder wherein said grinding unit is configured to be manipulated, said grinding unit including a plurality of blades, each of said blades being configured to grind the vegetable matter into a plurality of fine particles thereby facilitating the fine particles to be smoked and inhaled from a smoking device, said grinding unit comprising:

a second cylinder having primary end, a secondary and an exterior wall extending therebetween, said primary end having a well extending toward said secondary end, said well having a bounding surface, said exterior wall having an outside surface, said outside surface having a primary threaded portion extending downwardly from said primary end, said primary threaded portion threadably engaging said first threaded portion on said first cylinder such that said first cylinder is removably coupled to said second cylinder, a motor being positioned within said second cylinder, a first shaft being coupled to said motor such that said motor rotates said first shaft when said motor is turned on, said first shaft extending upwardly through said bounding surface of said well, said first shaft having a distal end with respect to said bounding surface, a second blade being coupled to said distal end of said first shaft such that said first shaft rotates said second blade when said motor is turned on, said second blade comprising:

a second hub being rotatably coupled to said distal end of said first shaft, and a pair of second arms, each of said second arms being coupled to and extending away from said second hub, said second arms being positioned on opposite sides of said second hub, each of said second arms having a distal end with respect to said second hub, each of said second arms having a bend thereon such that said distal end corresponding to each of said second arms is directed away form said bounding surface of said well, each of said second arms having a second edge, said second edge corresponding to each of said second arms being sharpened wherein said second edge corresponding to each of said second arms is configured to grind the vegetable matter into the fine particles, said screen in said first cylinder being configured to pass the fine particles into said second space thereby facilitating the fine particles to be removed from said second space;

a second shaft being coupled to and extending upwardly from said second hub, said second shaft having a distal end with respect to said second hub, said distal end of said second shaft engaging said first hub when said first cylinder is removably coupled to said second cylinder such that said second shaft rotates said first blade when said motor is turned on, a switch being coupled to said exterior wall of said second cylinder wherein said switch is configured to be manipulated, said switch being electrically coupled to said motor such that said switch turns said motor on and off, and a power supply being removably positioned within said second cylinder, said power supply being electrically coupled to said motor, said power supply comprising at least one battery.

* * * * *